(12) United States Patent
Rasa

(10) Patent No.: US 12,233,940 B2
(45) Date of Patent: Feb. 25, 2025

(54) ROLL OVER PROTECTION SYSTEM

(71) Applicant: Polaris Industries Inc., Medina, MN (US)

(72) Inventor: Joshua A. Rasa, Oakdale, MN (US)

(73) Assignee: Polaris Industries Inc., Medina, MN (US)

(*) Notice: Subject to any disclaimer, the term of this patent is extended or adjusted under 35 U.S.C. 154(b) by 0 days.

(21) Appl. No.: 18/369,998

(22) Filed: Sep. 19, 2023

(65) Prior Publication Data

US 2024/0083511 A1 Mar. 14, 2024

Related U.S. Application Data

(63) Continuation of application No. 17/960,619, filed on Oct. 5, 2022, now Pat. No. 11,814,104, which is a continuation of application No. 16/668,543, filed on Oct. 30, 2019, now Pat. No. 11,479,302.

(51) Int. Cl.
| | |
|---|---|
| *B62D 23/00* | (2006.01) |
| *B60R 21/13* | (2006.01) |
| *B62D 21/15* | (2006.01) |
| *B62D 33/04* | (2006.01) |
| *B60R 21/00* | (2006.01) |

(52) U.S. Cl.
CPC .......... *B62D 23/005* (2013.01); *B60R 21/13* (2013.01); *B62D 21/152* (2013.01); *B62D 33/044* (2013.01); *B60R 2021/0018* (2013.01)

(58) Field of Classification Search
CPC .......... B60R 21/13; B60R 23/005; B60R 2021/0018; B60R 2021/0074; B62D 27/065; B62D 33/0617; B62D 23/005

USPC .......... 296/181.34, 187.13, 190.03
See application file for complete search history.

(56) References Cited

U.S. PATENT DOCUMENTS

| | | |
|---|---|---|
| 8,827,028 B2 | 9/2014 | Sunsdahl et al. |
| 8,997,908 B2 | 4/2015 | Kinsman et al. |
| 8,998,253 B2 | 4/2015 | Novotny et al. |
| 9,393,894 B2 | 7/2016 | Steinmetz et al. |
| 9,540,052 B2 | 1/2017 | Burt, II et al. |
| 9,566,858 B2 | 2/2017 | Hicke et al. |
| 9,592,782 B2 | 3/2017 | Raska et al. |
| 9,725,023 B2 | 8/2017 | Miller et al. |

(Continued)

FOREIGN PATENT DOCUMENTS

| | | |
|---|---|---|
| CN | 104661903 A | 5/2015 |
| CN | 109789894 A | 5/2019 |
| WO | 2011/047593 A1 | 4/2011 |

*Primary Examiner* — Jason S Daniels
(74) *Attorney, Agent, or Firm* — Faegre Drinker Biddle & Reath LLP

(57) ABSTRACT

A support frame assembly configured to strengthen an upper frame portion of a frame of a vehicle, comprising a first frame member having a first end and a second end, and a second frame member having a first end and a second end, wherein both the first ends of the first and second frame members are configured to couple to a front half of the frame and the second ends of the first and second frame members are configured to couple to the front half of the frame to strengthen the upper frame portion, at least one of the first and second ends of each of the first and second frame members including at least one mechanically coupled joint configured for coupling each of the first and second frame members to the front half of the frame.

20 Claims, 19 Drawing Sheets

(56) References Cited

U.S. PATENT DOCUMENTS

| | | |
|---|---|---|
| 9,776,481 B2 | 10/2017 | Deckard et al. |
| 9,789,909 B2 | 10/2017 | Erspamer et al. |
| 10,369,861 B2 | 8/2019 | Deckard et al. |
| 10,479,422 B2 | 11/2019 | Hollman et al. |
| 11,479,302 B2 | 10/2022 | Rasa |
| 2002/0093224 A1 | 7/2002 | Richardson et al. |
| 2010/0314191 A1 | 12/2010 | Deckard et al. |
| 2015/0375803 A1 | 12/2015 | Raska |
| 2016/0052582 A1 | 2/2016 | Louisa |
| 2018/0065465 A1* | 3/2018 | Ward ................. B60G 7/02 |
| 2018/0178677 A1 | 6/2018 | Swain et al. |
| 2019/0009668 A1 | 1/2019 | Kuramoto et al. |
| 2019/0009823 A1 | 1/2019 | Savard et al. |
| 2019/0210668 A1 | 7/2019 | Endrizzi et al. |
| 2019/0232911 A1 | 8/2019 | Hisamura et al. |
| 2019/0291572 A1 | 9/2019 | Denis et al. |
| 2019/0299736 A1 | 10/2019 | Hisamura et al. |
| 2020/0282936 A1 | 9/2020 | Davis et al. |
| 2020/0346542 A1 | 11/2020 | Rasa et al. |
| 2021/0129921 A1 | 5/2021 | Rasa |
| 2023/0027831 A1 | 1/2023 | Rasa |
| 2023/0256815 A1* | 8/2023 | Dunne, Jr. ............ B60K 17/16 180/245 |
| 2024/0017608 A1* | 1/2024 | Williams ............ B62D 21/11 |

\* cited by examiner

ROLL OVER PROTECTION SYSTEM

CROSS-REFERENCE TO RELATED APPLICATIONS

The present application is a continuation of U.S. patent application Ser. No. 17/960,619, filed Oct. 5, 2022, which is a continuation of U.S. patent application Ser. No. 16/668,543, filed Oct. 30, 2019, now U.S. Pat. No. 11,479,302, the entire disclosures of which are incorporated herein by reference.

FIELD OF THE INVENTION

The present invention relates to off-road vehicles including side-by-side vehicles or utility vehicles ("UTVs"), specifically to upper frame portions of these off-road vehicles.

BACKGROUND OF THE INVENTION

Generally, UTVs or off-road side-by-side vehicles are used to carry one or more passengers and a small amount of cargo over a variety of terrains. Due to the terrain often traveled when using UTVs, the frame of the vehicle is susceptible to damage. Thus, a need exists for a frame design that is capable of further protecting the frame as well as other components of the vehicle.

SUMMARY OF THE INVENTION

In one embodiment of the disclosure, a vehicle comprises a plurality of ground-engaging members, and a frame assembly extending longitudinally between a front portion and a rear portion, the frame assembly having an upper frame portion, a lower frame portion, and a support frame assembly, the support frame assembly being separable from the upper frame portion and the lower frame portion and configured to reinforce the upper frame portion, wherein the support frame assembly includes at least one mechanically coupled joint between the support frame and a remainder of the frame.

In another embodiment of the disclosure, a support frame assembly configured to strengthen an upper frame portion of a frame of a vehicle comprises a first frame member having a first end and a second end, and a second frame member having a first end and a second end, wherein both the first ends of the first and second frame members are configured to couple to a front half of the frame and the second ends of the first and second frame members are configured to couple to the front half of the frame to strengthen the upper frame portion, at least one of the first and second ends of each of the first and second frame members including at least one mechanically coupled joint configured for coupling each of the first and second frame members to the front half of the frame.

DETAILED DESCRIPTION OF THE DRAWINGS

Figure 1:
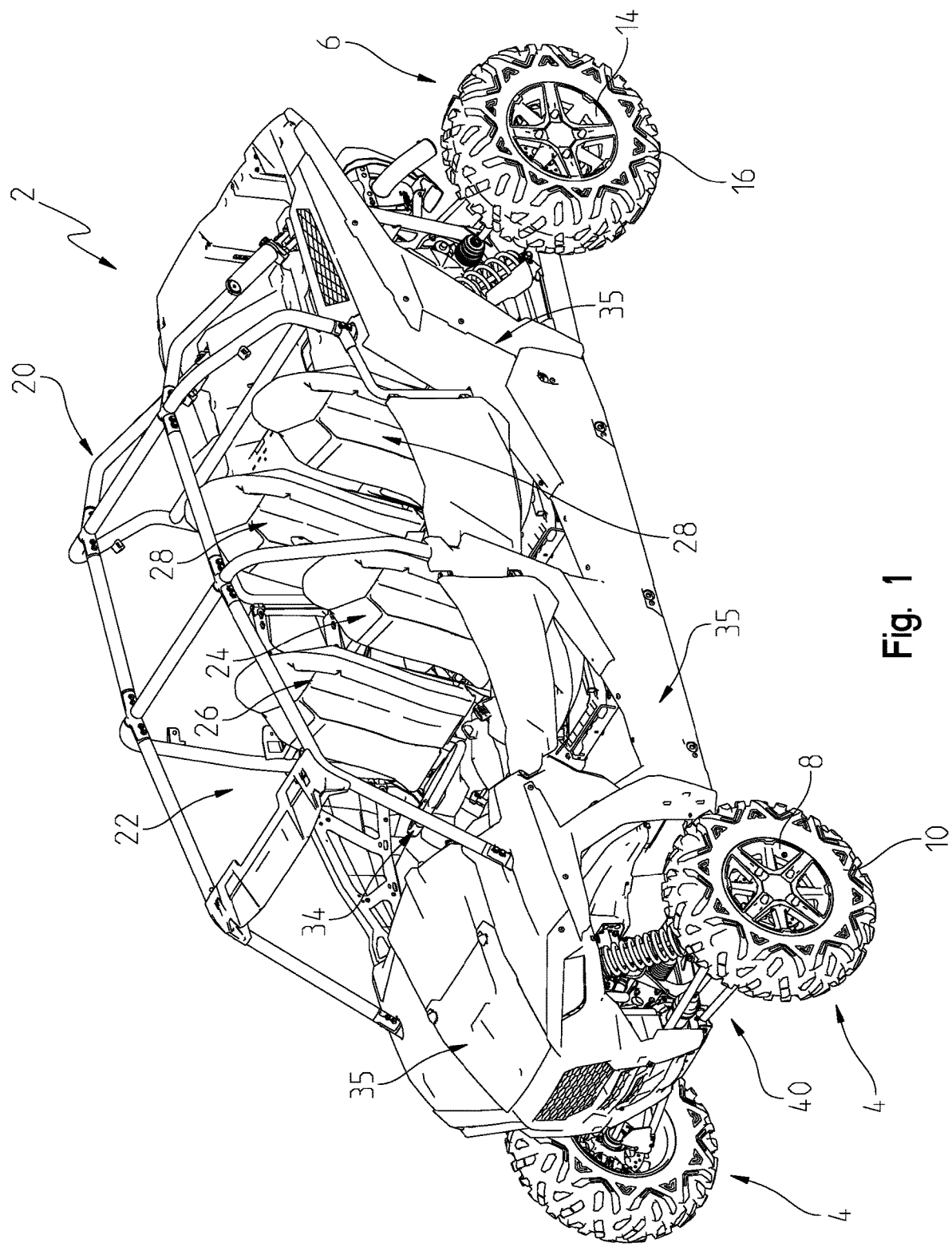
FIG. 1 shows a front left perspective view of a vehicle of the present disclosure.
Figure 2:
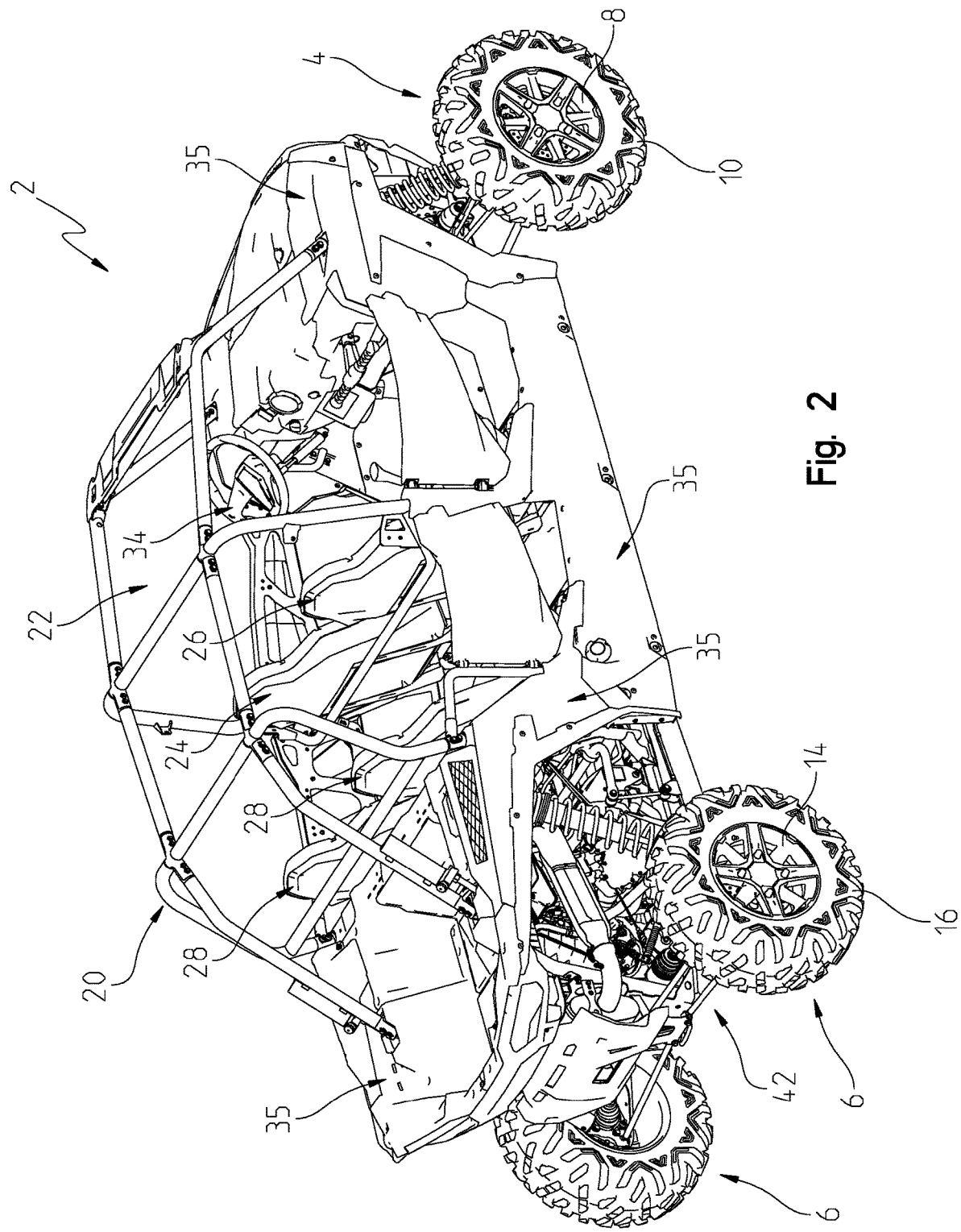
FIG. 2 shows a right rear perspective view of the vehicle of FIG. 1.
Figure 3:
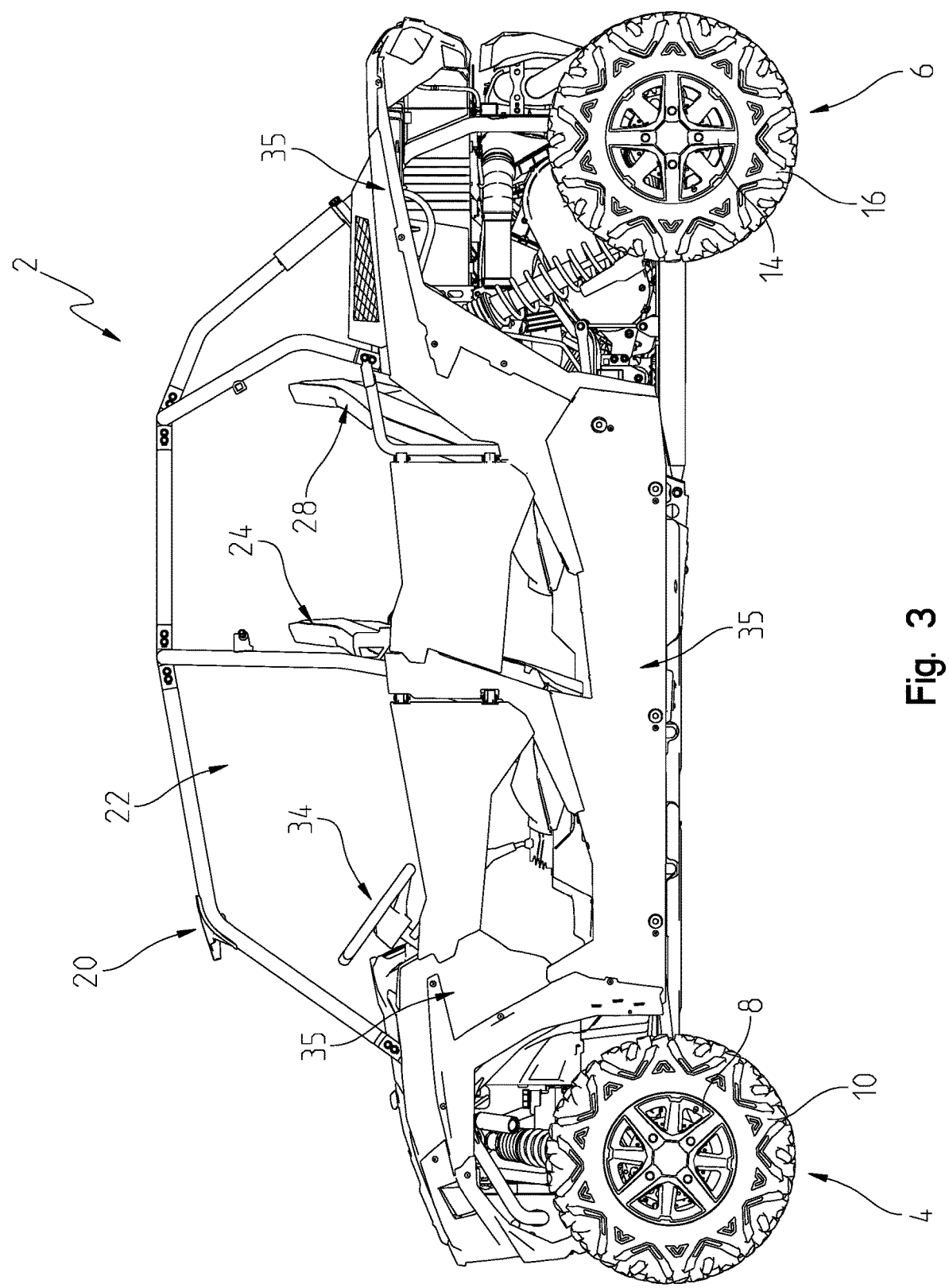
FIG. 3 shows a left side elevational view of the vehicle of FIG. 1.
Figure 4:
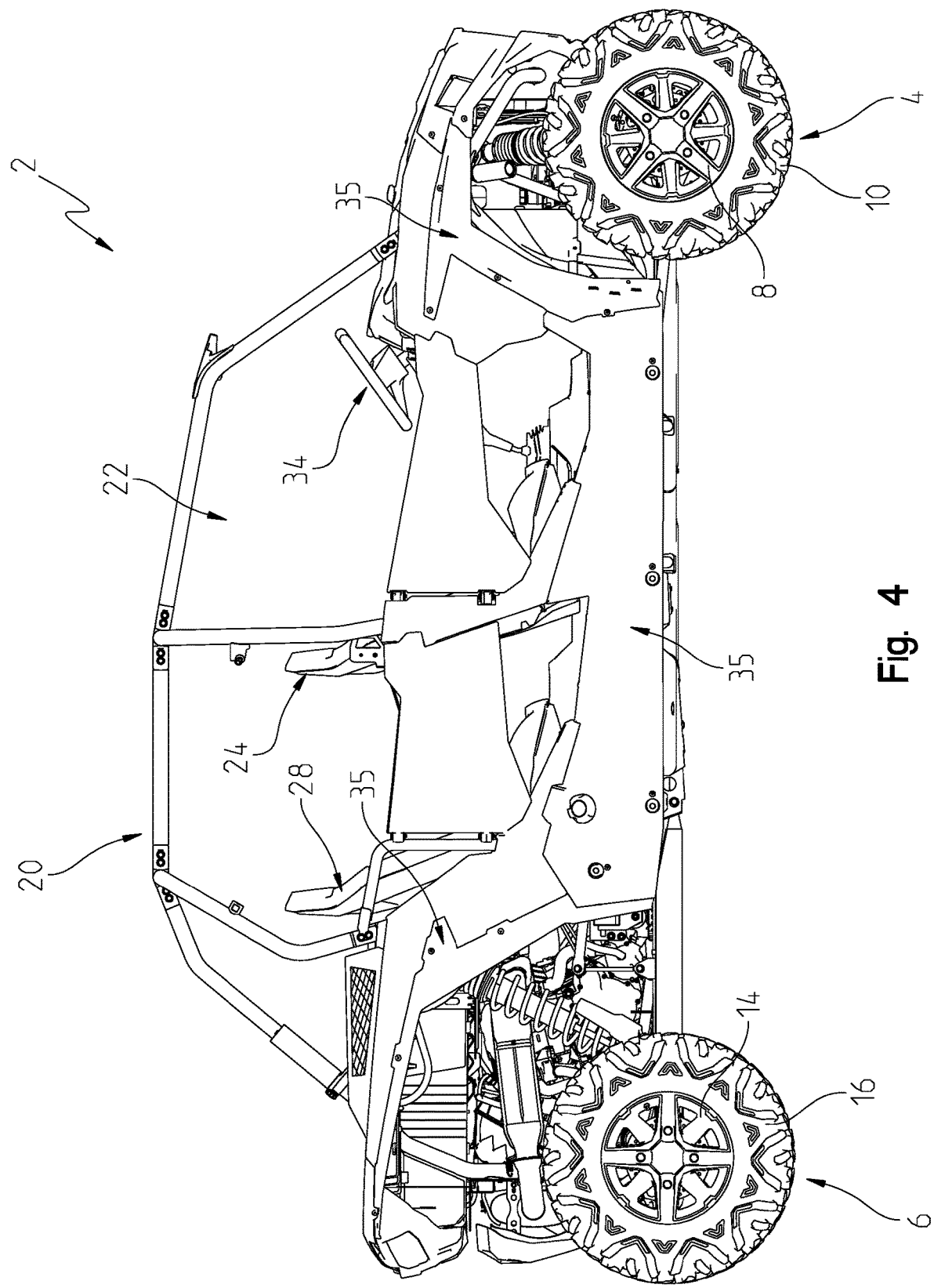
FIG. 4 shows a right side elevational view of the vehicle of FIG. 1.

With reference first to FIGS. 1-4, the vehicle of the present invention will be described. As shown, the vehicle is generally depicted as reference number 2 which includes front ground engaging members 4 and rear ground engaging members 6. Front ground engaging members 4 are comprised of rims 8 and tires 10, and rear ground engaging members 6 are comprised of rims 14 and tires 16. Ground engaging members 4 and 6 support a vehicle frame, which is shown generally at 20, through front and rear suspension assemblies 40 and 42, respectively. Vehicle frame 20 supports a seating area 22 comprised of a driver's seat 24 and a front passenger seat 26. In various embodiments, seating area 22 may also include one or more rear passenger seats 28 positioned rearward of driver's seat 24 and front passenger seat 26. As best shown in FIG. 2, vehicle 2 further includes a steering assembly for steering front ground engaging members 4 whereby the steering assembly includes a steering wheel 34.

Figure 5:
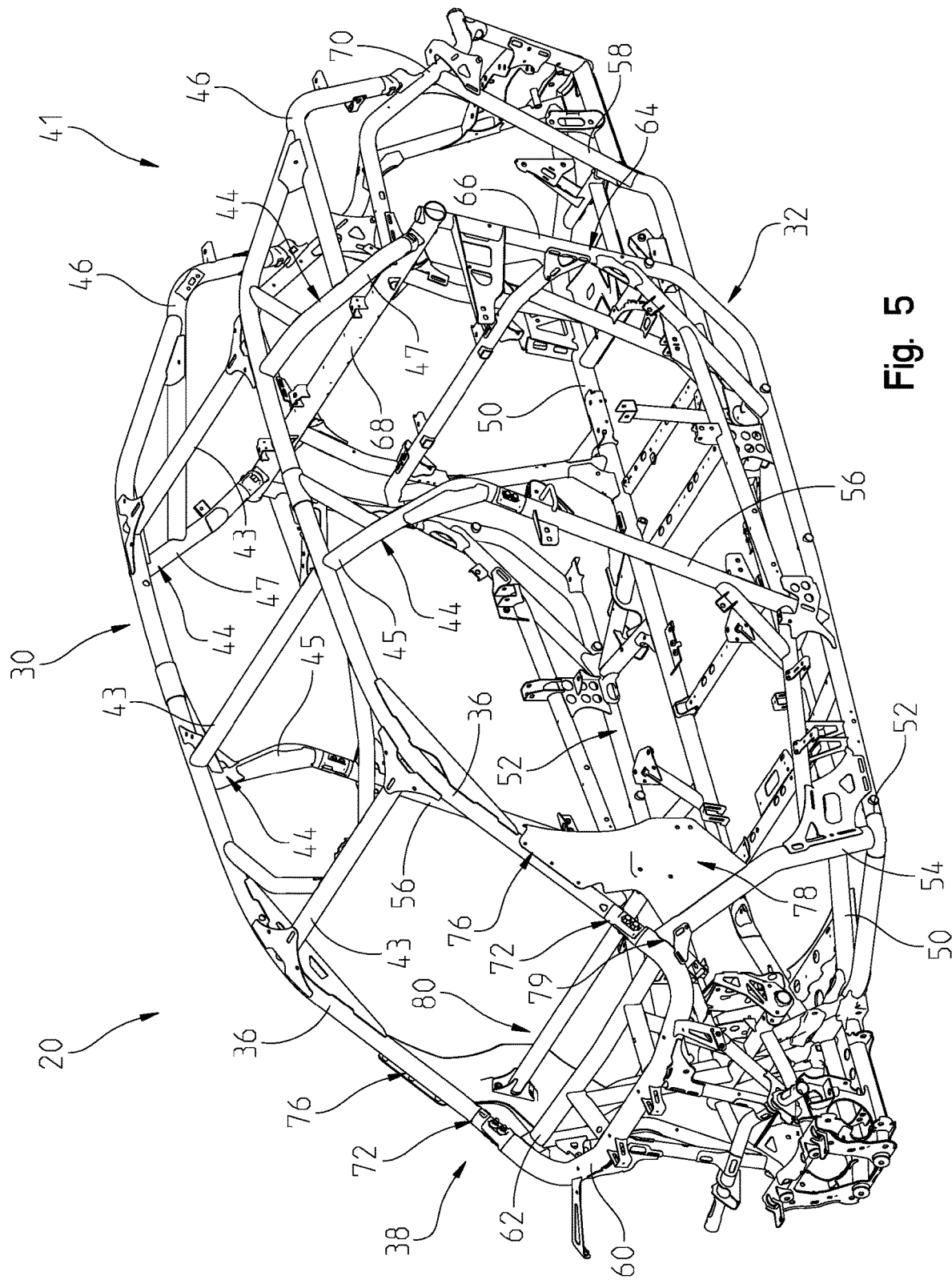
FIG. 5 shows a front left perspective view of a frame of the present disclosure including a simplified depiction of a first embodiment of a support frame assembly of the present disclosure.
Figure 6:
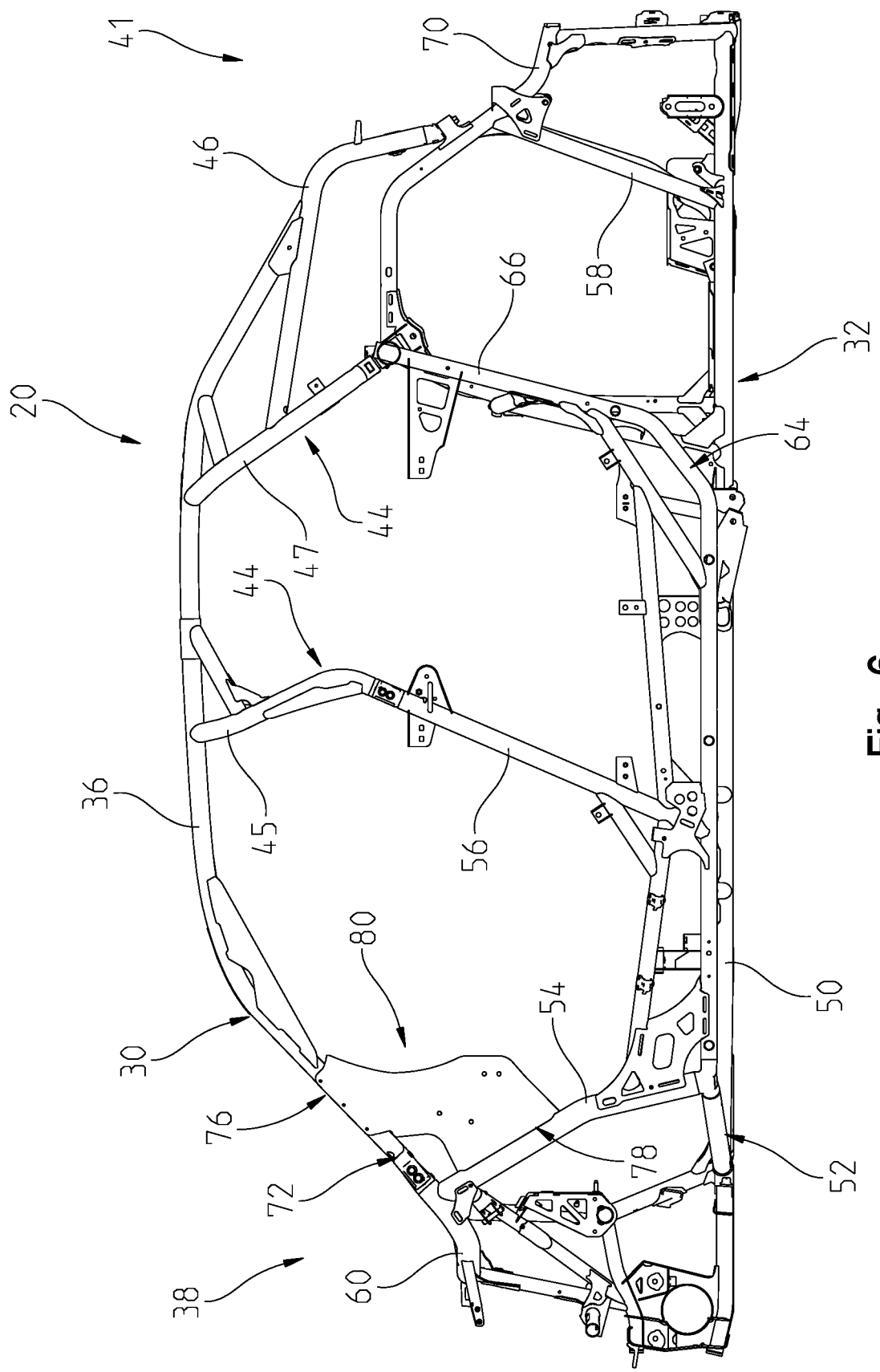
FIG. 6 shows a side elevational view of the frame of FIG. 5.

Referring now to FIGS. 5 and 6, frame 20 of vehicle 2 is comprised of an upper frame portion or cab frame 30 that generally extends over the seating area 22 and a lower frame portion 32 positioned below and supporting cab frame 30. Frame 20 is configured to support various body panels 35 (FIGS. 1-4).

Cab frame 30 of frame 20 will now be described in further detail. Cab frame 30 generally includes a pair of longitudinal frame members 36 extending from a front 38 of frame 20 to a rear 41 of frame 20, a plurality of laterally-extending frame members 43 coupled between longitudinal frame members 36, a pair of downwardly-extending frame members 44 extending from each of longitudinal frame member 36 and coupling cab frame 30 to lower frame portion 32, and a rear frame member 46 (illustratively having an L-shape) coupled to one of each of the longitudinal frame members 36 and of the rearward downwardly-extending frame members 44 for coupling cab frame 30 to lower frame portion 32. Downwardly-extending frame member 44 includes a first or forward member 45 and a second or rearward member 47, where first member 45 is positioned forward of second member 47.

With reference still to FIGS. 5 and 6, lower frame portion 32 will be described in further detail. Lower frame portion 32 generally includes a pair of inner longitudinal frame members 50, a pair of outer longitudinal frame members 52, a pair of front upwardly-extending frame members 54, a pair of middle upwardly-extending frame members 56, a pair of rear upwardly-extending frame members 58, a front U-shaped frame member 60 and a front laterally-extending frame member 62 coupled to front upwardly-extending frame members 54. Rear ends 64 of outer longitudinal frame members 52 each include an upwardly-extending portion 66, which are coupled together by a rear laterally-extending frame member 68. In various embodiments, lower frame portion 32 further includes a rear frame member 70 coupled between rear laterally-extending frame member 68 and rear upwardly-extending frame members 58. In one embodiment, rear frame member 70 may have an upside-down or reverse "S" shape in that rear frame member 70 includes a first bent or curved portion and a second bent or curved portion. In various embodiments, front, middle, and rear upwardly-extending frame members 54, 56, and 58 are angled relative to vertical. In one embodiment, front upwardly-extending frame members 54 are angled forwardly relative to vertical, while middle and rear upwardly-extending frame members 56 and 58 are angled rearwardly relative to vertical.

Lower frame portion 32 is coupled to cab frame 30 via U-shaped frame member 60, where U-shaped frame member 60 is coupled to longitudinal frame member 36 at front ends 72. Additionally, middle upwardly-extending frame members 56 of lower frame portion 32 are coupled to first member 45 of downwardly-extending frame members 44 of cab frame 30. Lower frame portion 32 is also coupled to cab frame 30 with laterally-extending frame member 68 of lower frame portion 32 being coupled to second member 47 of downwardly-extending frame members 44. Further, lower frame portion 32 is coupled to cab frame 30 when rear frame member 70 of lower frame portion 32 is coupled to rear frame member 46 of cab frame 30.

Referring now to FIGS. 5-18, frame 20 further includes a support section or frame assembly 80 configured to couple cab frame 30 to lower frame portion 32 and, more particularly, is coupled between longitudinal frame members 36 of cab frame 30 and front upwardly-extending frame members 54 of lower frame portion 32 to provide additional support to cab frame 30 and strengthen cab frame 30 if a force is applied to cab frame 30. In various embodiments, support section 80 is coupled to longitudinal frame members 36 at a first position 76 spaced apart from a forwardmost extent of longitudinal frame members 36 (e.g., spaced apart from front ends 72) and is coupled to front upwardly-extending frame members 54 at a second position 78 spaced apart from an upwardmost extent of front upwardly-extending frame members 54 (e.g., spaced apart from upper end 79 thereof), wherein first and second positions 76 and 78 are positioned within a front half of vehicle 2, or in some embodiments, a front ⅓ of vehicle 2. In various embodiments, first position 76 is along longitudinal frame member 36 at a position that is higher than and longitudinally rearward of front end 72, and second position 78 is along front upwardly-extending frame members 54 at a position that is lower than and longitudinally rearward of upper end 79. As such, support section 80 is coupled to cab frame 30 and lower frame portion 32 at position rearward of at least one point in which cab frame 30 is coupled to lower frame portion 32. Furthermore, in general, support section 80 is positioned forward of seats 24, 26 and rearward of front ground engaging members 4.

Figure 7:
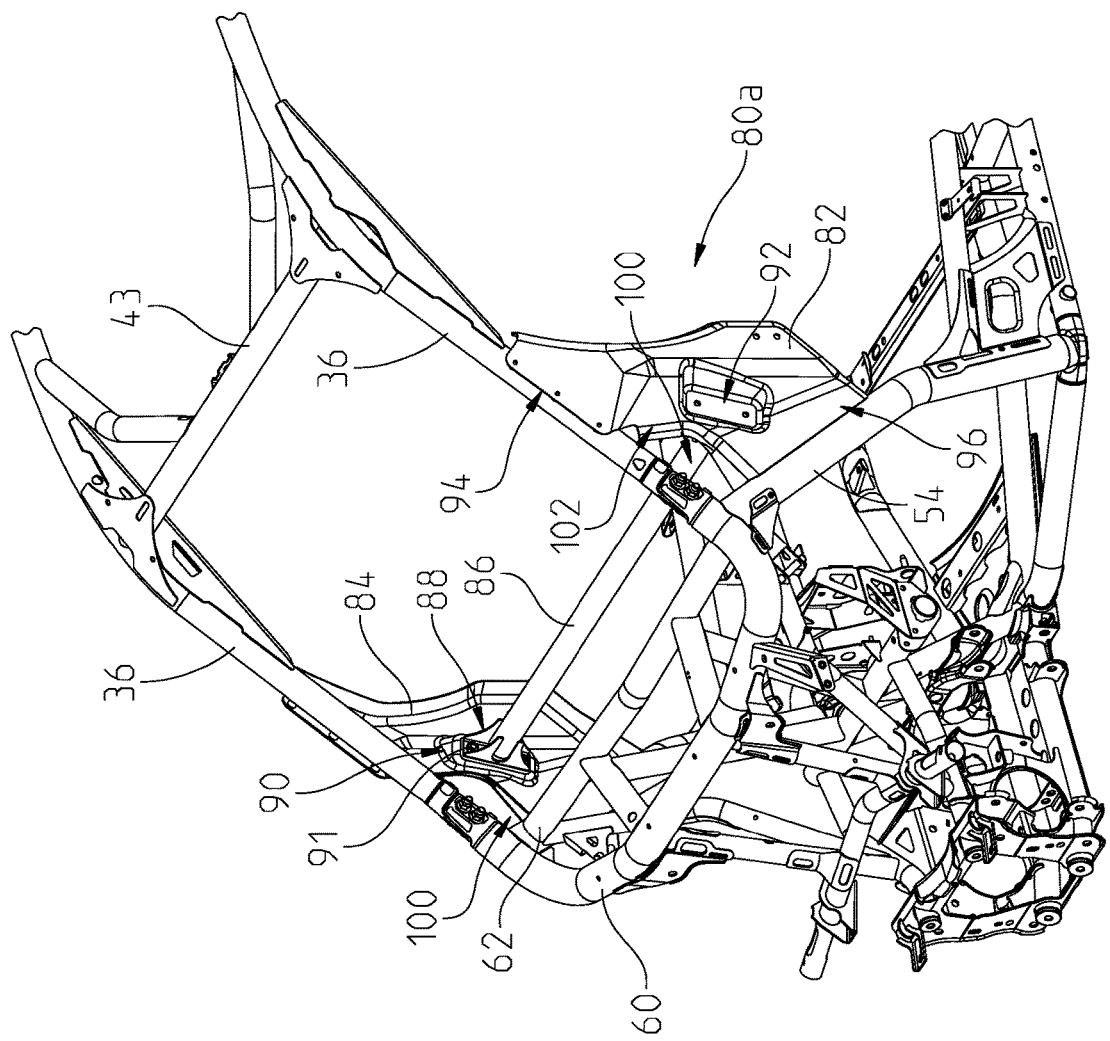
FIG. 7 shows a detailed and enlarged front left perspective view of the first embodiment of the support frame assembly of FIG. 5.
Figure 8:
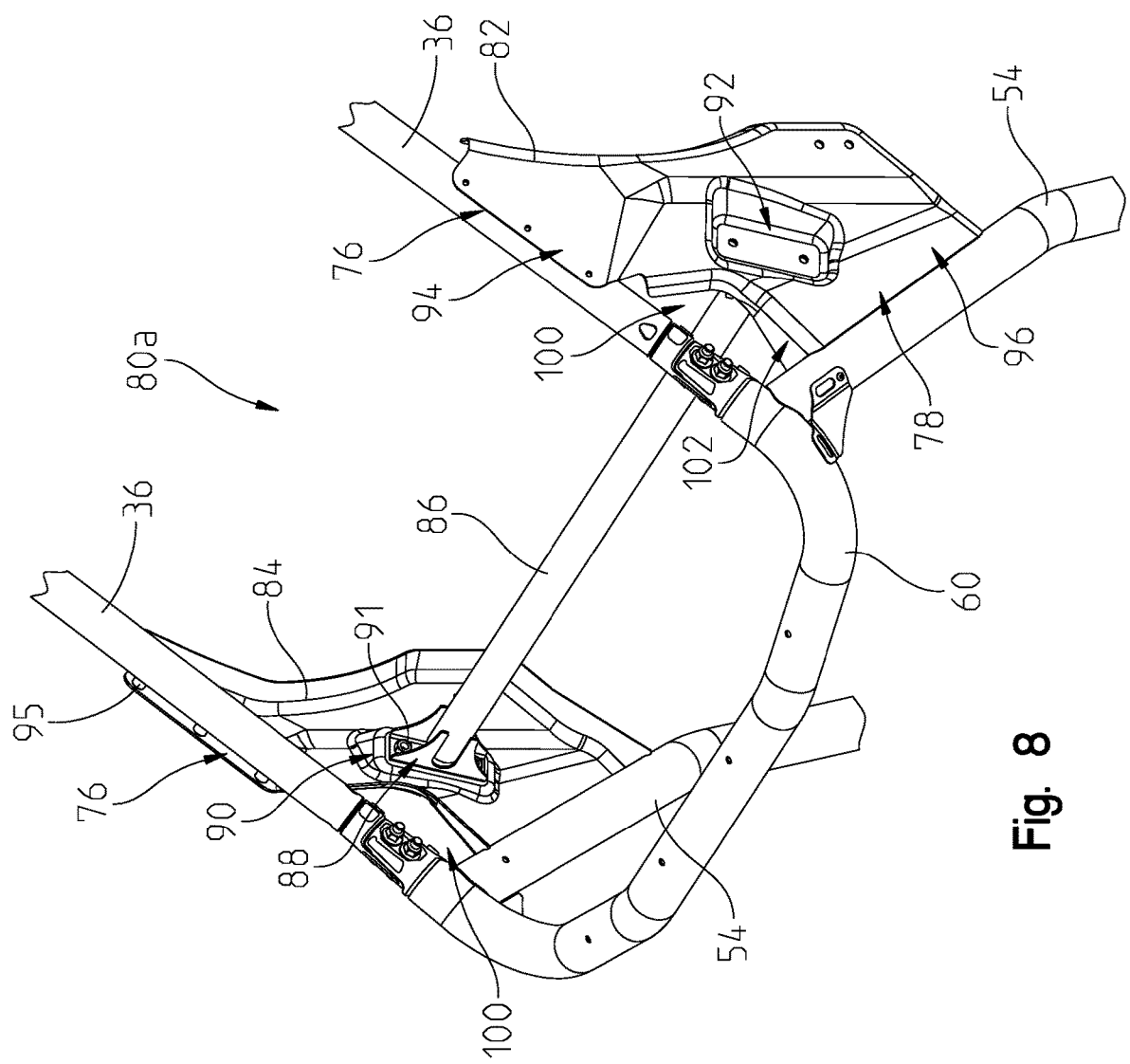
FIG. 8 shows a further enlarged front left perspective view of the support frame assembly of FIG. 7.
Figure 9:
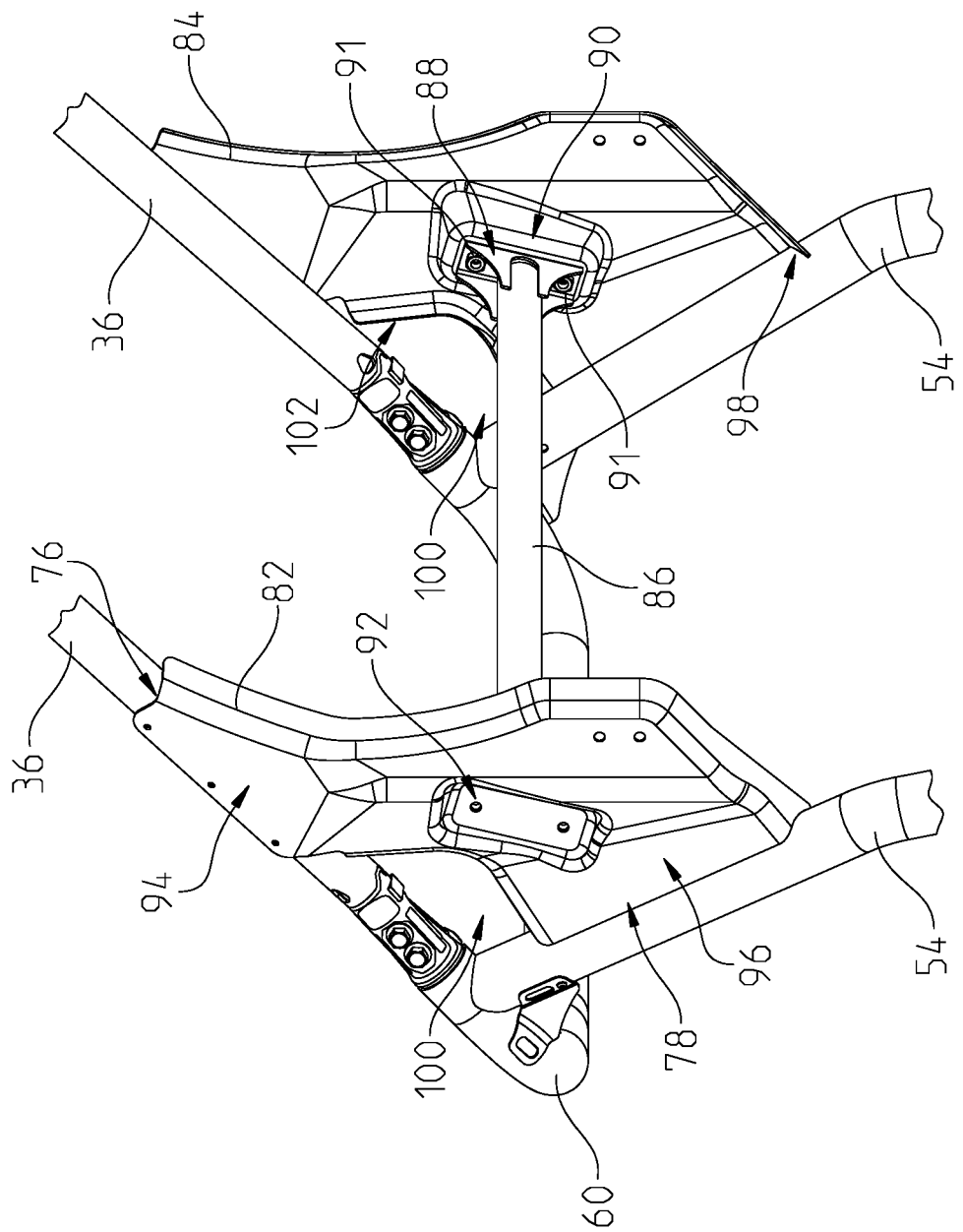
FIG. 9 is an enlarged rear left perspective view of the support frame assembly of FIG. 8.

With reference to FIGS. 7-9, one embodiment 80a of support section 80 is shown. Support section 80a generally includes a first or left-side panel 82, a second or right-side panel 84, and a laterally-extending frame member 86 coupled between first panel 82 and second panel 84. Laterally-extending frame member 86 generally includes a bracket 88 at each end thereof for coupling to a protrusion 90 on an interior surface of each panel 82, 84 via mechanical fasteners (e.g., bolts, nuts, screws, rivets), a welding, adhesive, and/or any other coupling mechanism (illustratively a plurality of couplers 91). Protrusion 90 is opposite of an indentation 92 on an exterior surface of each of panels 82, 84. Laterally-extending frame member 86 is generally positioned longitudinally rearward of front laterally-extending frame member 62 and front U-shaped frame member 60.

Each of first panel 82 and second panel 84 are coupled to longitudinal frame member 36 at a first or upper end 94 of panels 82, 84 at position 76 and to front upwardly-extending frame members 54 at a second or lower end 96 of panels 82, 84 at position 78. In this way, upper and lower ends 94, 96 of panels 82, 84 also are positioned rearward of at least one point in which cab frame 30 is coupled to lower frame portion 32. First end 94 is mechanically coupled to longitudinal frame member 36 via mechanical fasteners (e.g., bolts, nuts, screws, rivets), a welding, adhesive, and/or any other coupling mechanism. In various embodiments, first end 94 further includes at least one bushing 95 (illustratively, three bushings 95) that extends between longitudinal frame member 36 and first end 94 and/or at least partially through longitudinal frame member 36. Bushing(s) 95 provide spacing between longitudinal frame member 36 and first end 94. In various embodiments, a washer may be positioned between bushing 95 and first end 94 and/or longitudinal frame member 36. Second end 96 is coupled onto front upwardly-extending frame members 54 via recessed extensions 98 (FIG. 9) such that second end 96 is flush with front upwardly-extending frame member 54. Once recessed extensions 98 are positioned on frame members 54, welds, adhesives, or other coupling mechanisms may be used to further secure panels 82, 84 to frame member 54. In various embodiments, an opening 100 extends between longitudinal frame member 36, front upwardly-extending frame member 54 and a forward surface 102 of panel 82/84. In one embodiment, opening 100 is in the shape of a polygon.

Figure 10:
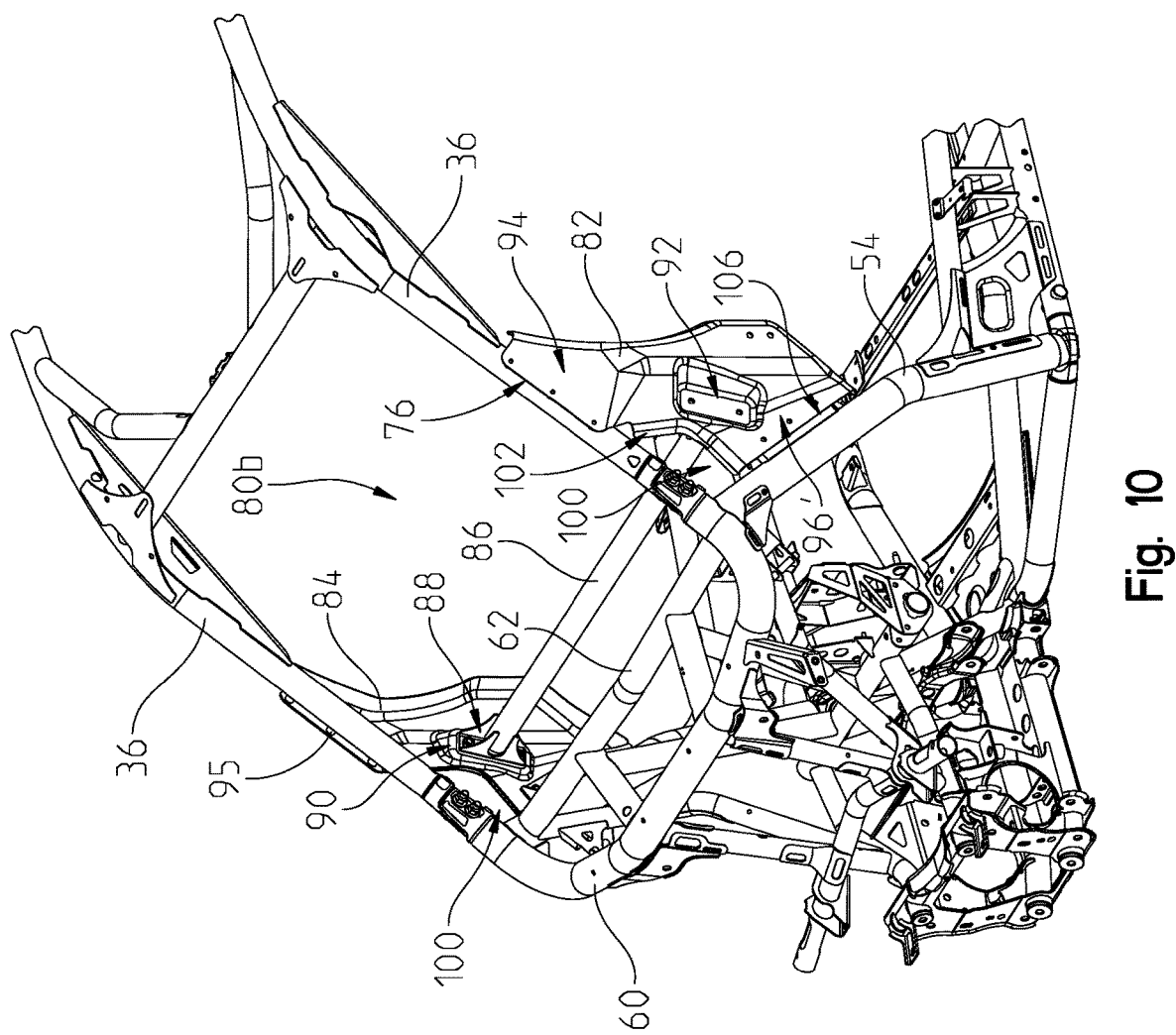
FIG. 10 shows an enlarged front left perspective view of a second embodiment of a support frame assembly of the frame of the vehicle of FIG. 1.
Figure 11:
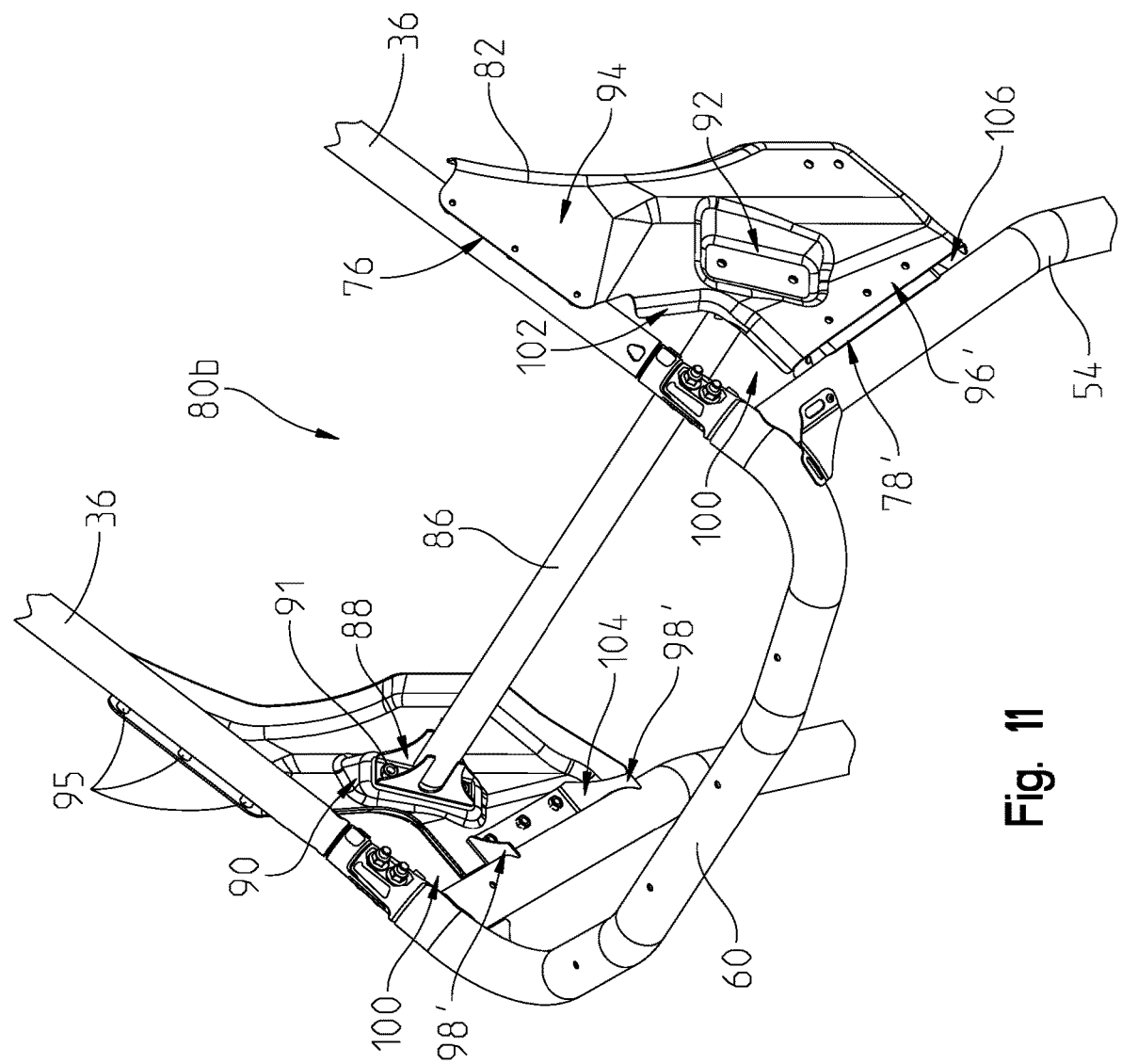
FIG. 11 shows a further enlarged front left perspective view of the support frame assembly of FIG. 10.
Figure 12:
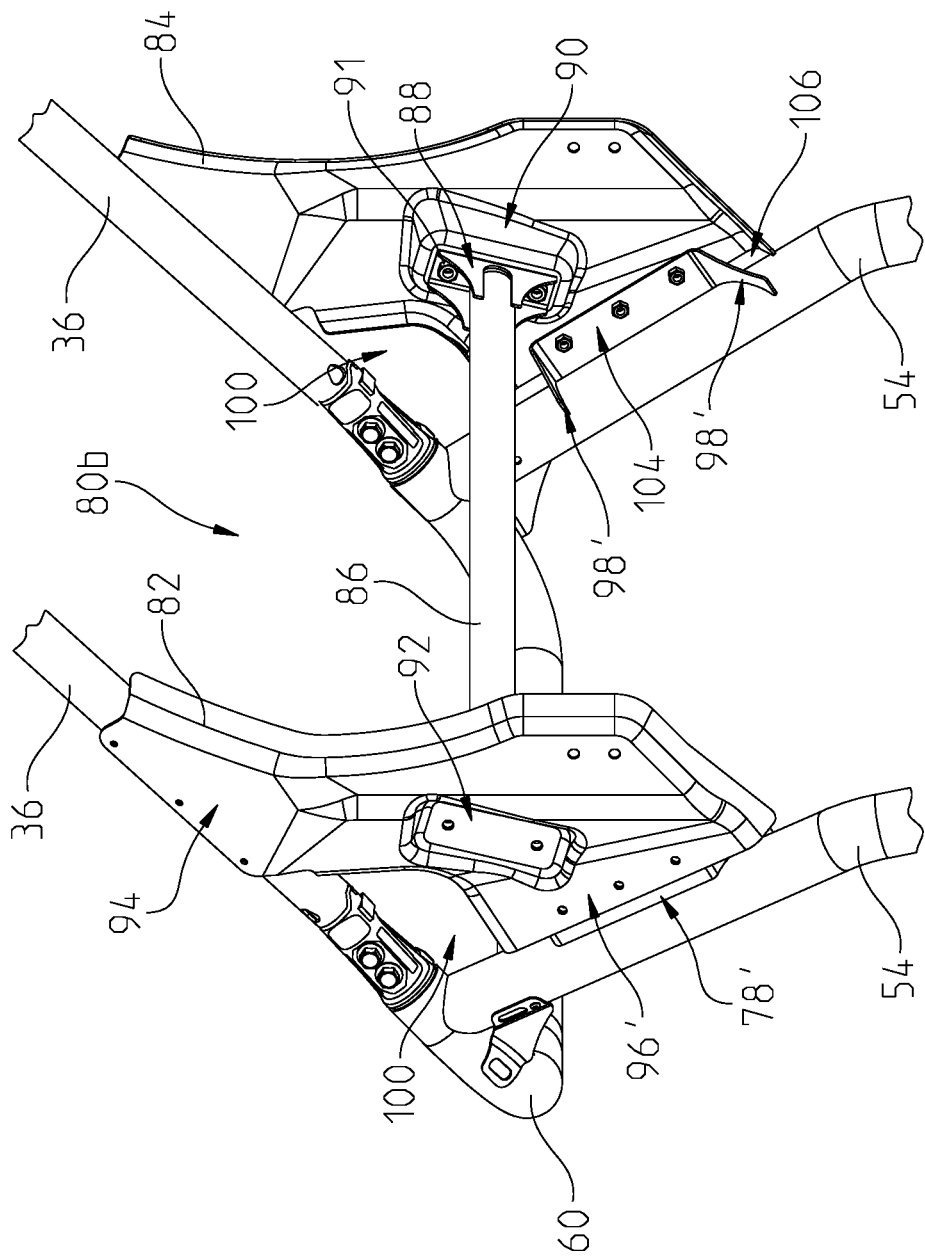
FIG. 12 is an enlarged rear left perspective view of the support frame assembly of FIG. 11.
Figure 13:
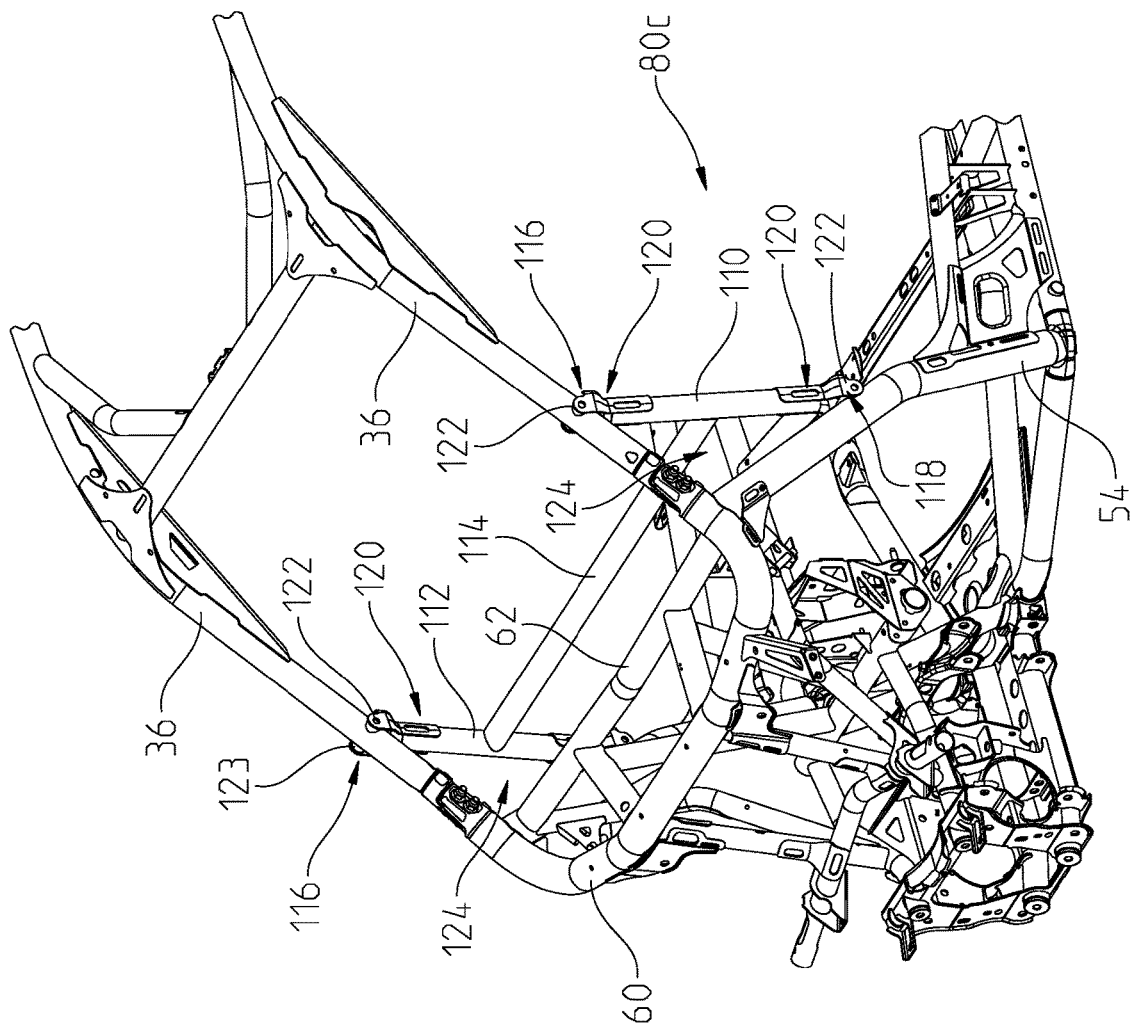
FIG. 13 shows an enlarged front left perspective view of a third embodiment of a support frame assembly of the frame of the vehicle of FIG. 1.

Referring now to FIGS. 10-12, another embodiment 80b of support section is shown. Support section 80b is substantially similar to first embodiment 80a with like reference numbers referring to like features/components. However, in the embodiment of FIGS. 10-12, panels 82, 84 each include a lower or second end 96' which, rather than hooking onto front upwardly-extending frame members 54, is instead coupled to front upwardly-extending frame members 54 at position 78' via a bracket 104 (FIGS. 11 and 12). Bracket 104 is mechanically coupled to panel 82/84 via mechanical fasteners, a welding, adhesive, and/or any other coupling mechanism and received onto front upwardly-extending frame members 54 similarly to second end 96 of panel 82/84 of first embodiment 80a via recessed extensions 98'. The use of bracket 104 results in a gap 106 between second end 96' of panel 82/84 and upwardly-extending frame member 54.

With reference now to FIGS. 13-15B, yet another embodiment 80c of support section 80 is shown. Support section 80c generally includes a first vertical support frame member 110, a second vertical support frame member 112, and a laterally-extending support frame member 114 extending between and coupled to first and second vertical support frame member 110 and 112. In various embodiments, laterally-extending support frame member 114 is welded to first and second support frame members 110, 112, while in other various embodiments, laterally-extending support frame member 114 may be coupled to first and second support frame member 110, 112 via mechanical fasteners (e.g., brackets, bolts, nuts, screws, rivets), adhesive, and/or any other coupling mechanism.

First and second vertical support frame members 110 and 112 extend between and are coupled to longitudinal frame members 36 at a first or upper end 116 and to front upwardly-extending frame members 54 at a second or lower end 118. In general, first and second vertical support frame members 110 and 112 are substantially linear and vertical frame members. In various embodiments, each end 116 and 118 of first and second vertical support frame members 110 and 112 include a bracket 120 having at least one flange 122 (illustratively, two flanges 122) configured to be positioned on either side of longitudinal frame member 36 or front upwardly-extending frame member 54. Bracket 120, with flanges 122 on either side of frame member 36 or 54, is coupled to frame member 36 or 54 through mechanical coupling mechanisms (for example, with a coupler passing through flanges 122 of bracket 120 and frame member 36 or 54 creating a mechanically coupled joint, a welding between bracket 120 and frame member 36 or 54, or other various mechanical coupling mechanism).

Figure 14:
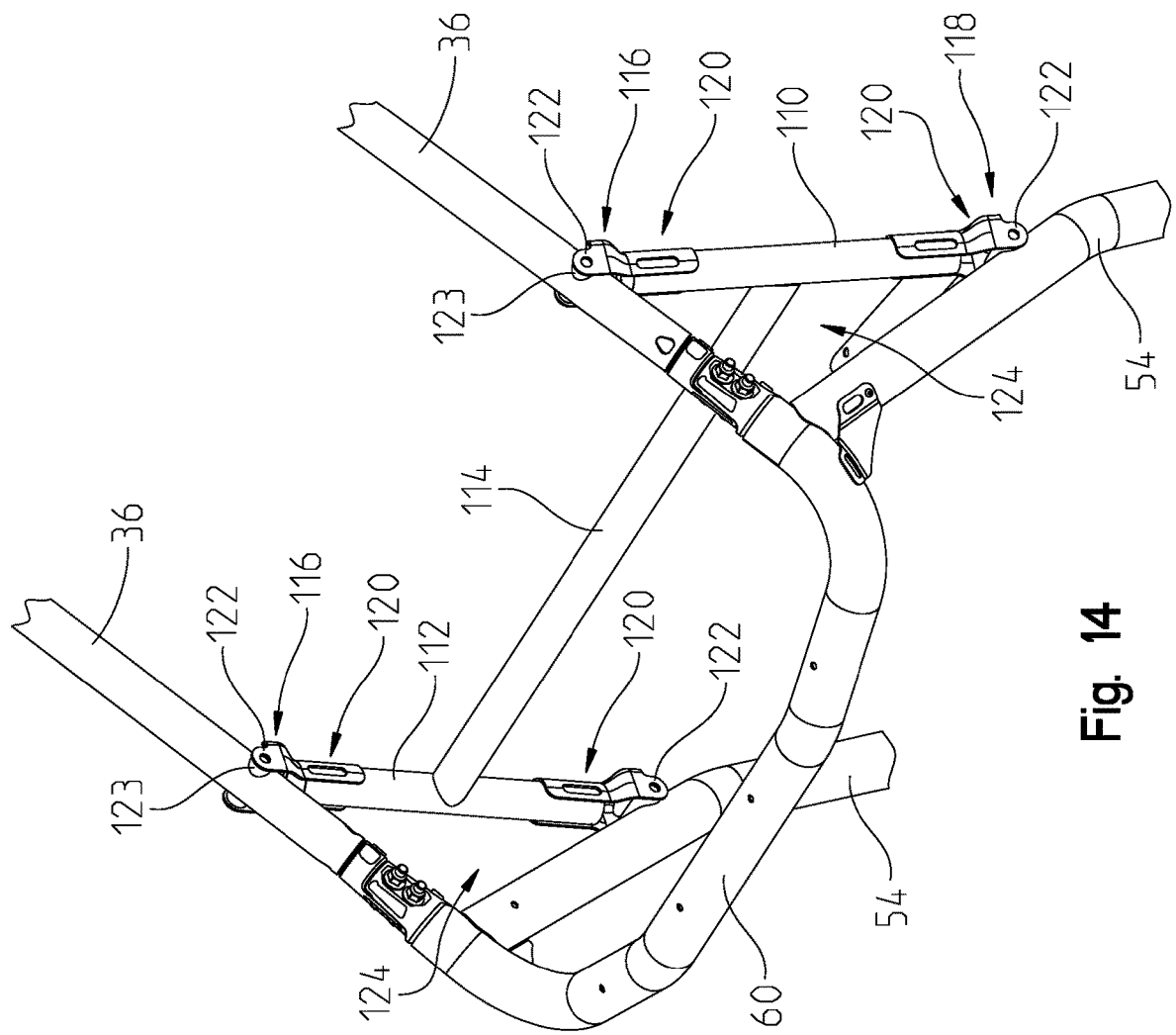
FIG. 14 shows a further enlarged front left perspective view of the support frame assembly of FIG. 13.
Figure 15A:
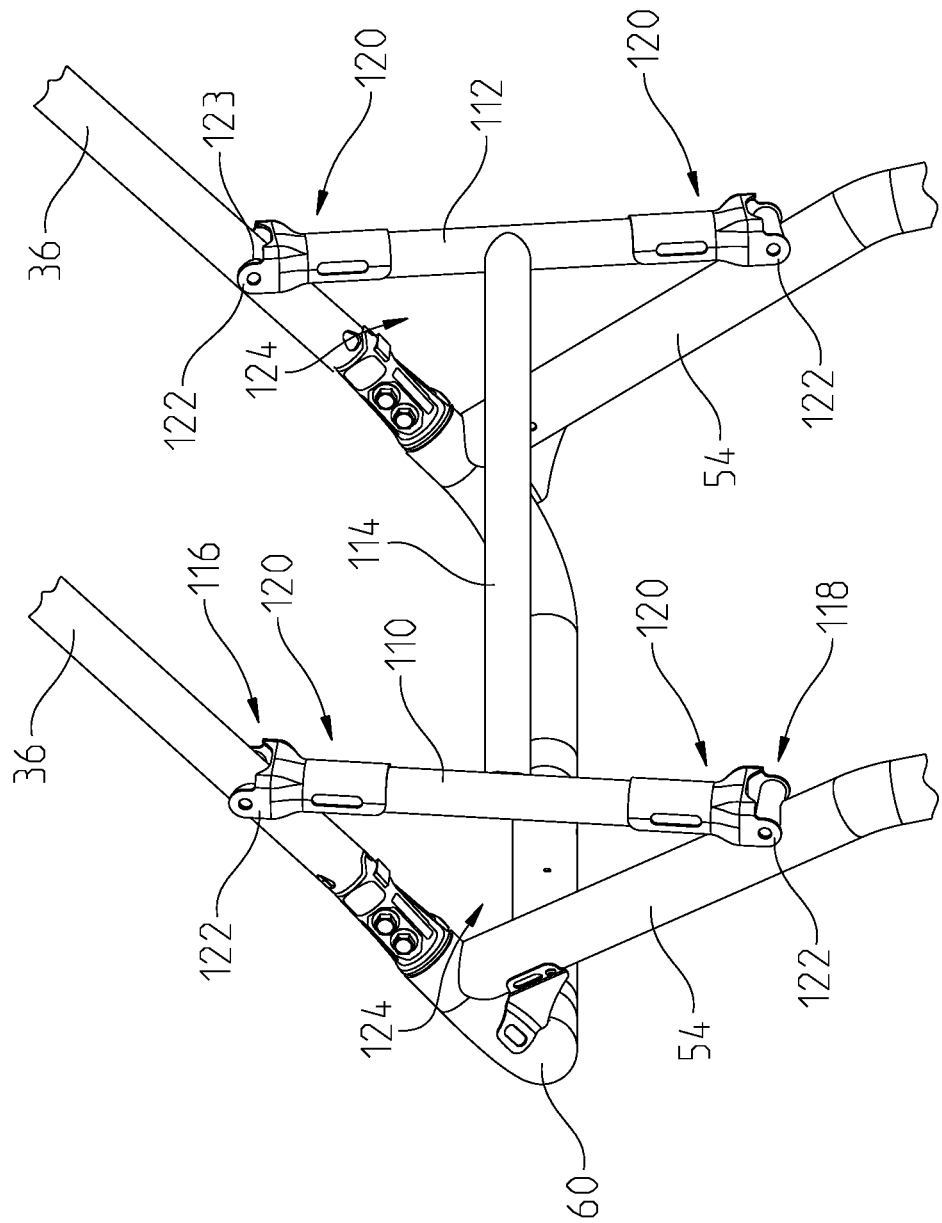
FIG. 15A is an enlarged rear left perspective view of the support frame assembly of FIG. 14.
Figure 15B:
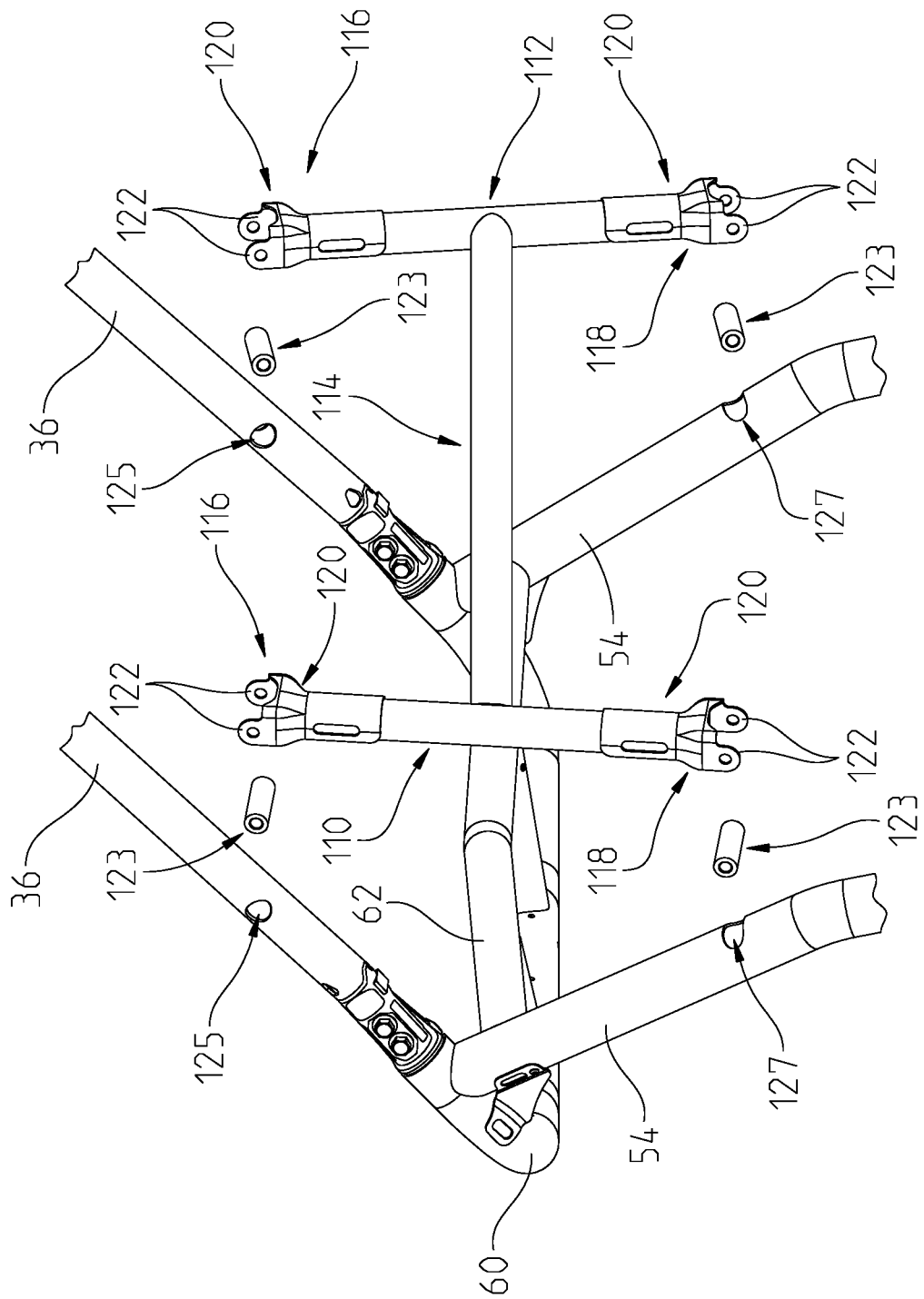
FIG. 15B shows an exploded view of the fourth embodiment of the support frame assembly of FIG. 15A.

Referring to FIGS. 14-15B, in various embodiments, bracket 120 further includes at least one bushing 123 extending at least partially (illustratively, fully at end 116 and partially at end 118) through frame member 36 or 54 and coupled or welded to an interior surface of one or both of flanges 122. When bushing 123 fully extends through frame member 36 or 54 (as seen at end 116), bushing 123 passes through an opening 125 through frame member 36 and is substantially centered through frame member 36. However, when bushing 123 partially extends through frame member 36 or 54 (as seen at end 118), bushing 123 is received within an indentation 127 in frame member 54 and is substantially offset from center. Once bushing 123 is received within indentation 127, bushing 123 may be buried into a large coped weld mechanically coupling bushing 123 to frame member 54. When bracket 120 is coupled to frame member 36 or 54, a space may exist between bushing 123 and frame member 36 or 54 for ease of installation. In various embodiments, a washer (not shown) may be positioned between bushing 123 and one or both of flanges 122 and/or between bushing 123 and frame member 36 or 54.

In various embodiments, when first and second vertical support frame members 110 and 112 are coupled to frame member 36 and 54, an opening 124 extends between either vertical support member 110 or 112 and the respective longitudinal frame member 36 and front upwardly-extending frame member 54 it is coupled to. In one embodiment, opening 124 is in the shape of a triangle. Similar to first and second embodiments 80a and 80b, laterally-extending frame member 114 is generally positioned longitudinally rearward of front laterally-extending frame member 62 and front U-shaped frame member 60.

Figure 16:
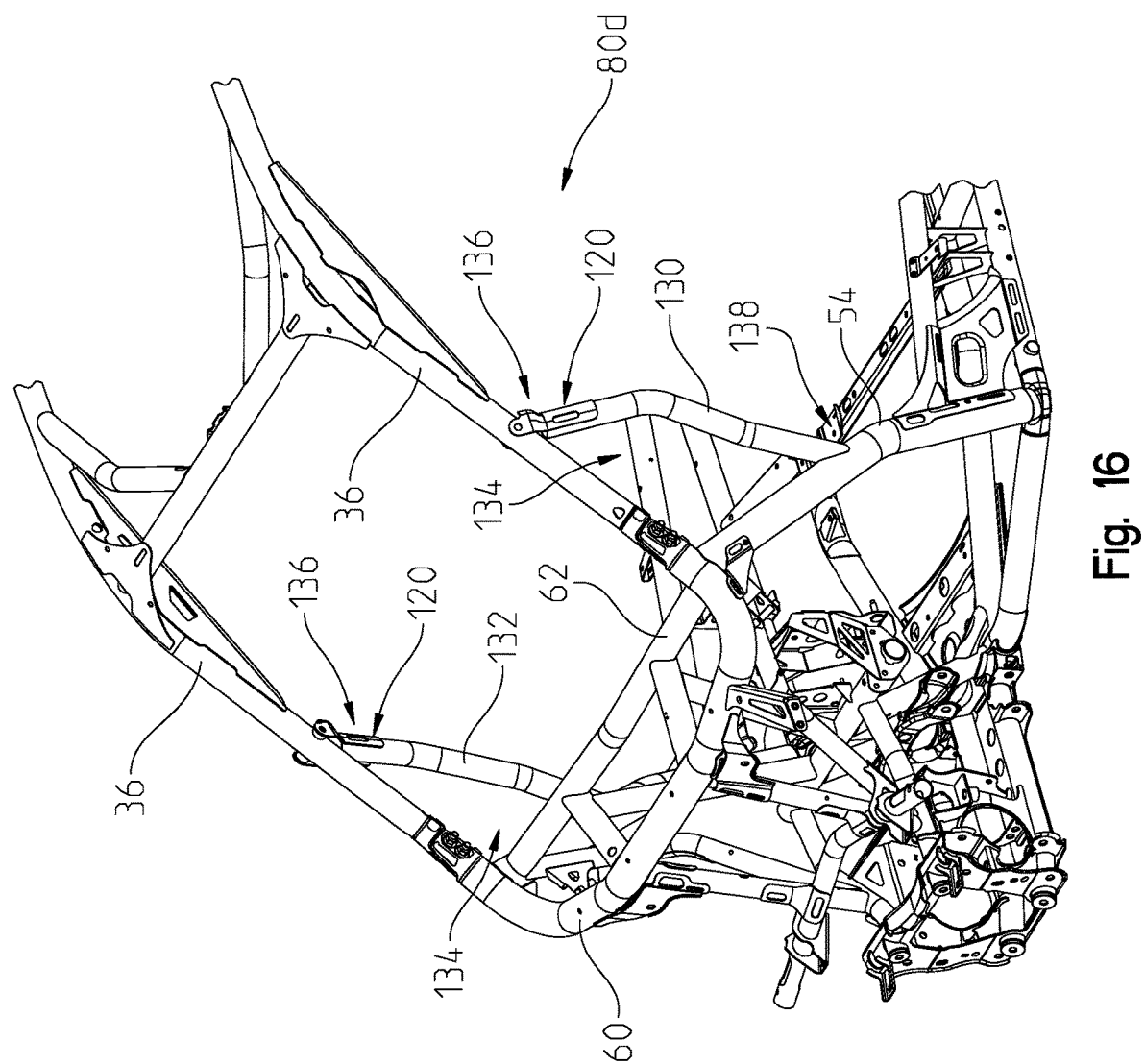
FIG. 16 shows an enlarged front left perspective view of a fourth embodiment of a support frame assembly of the frame of the vehicle of FIG. 1.
Figure 17:
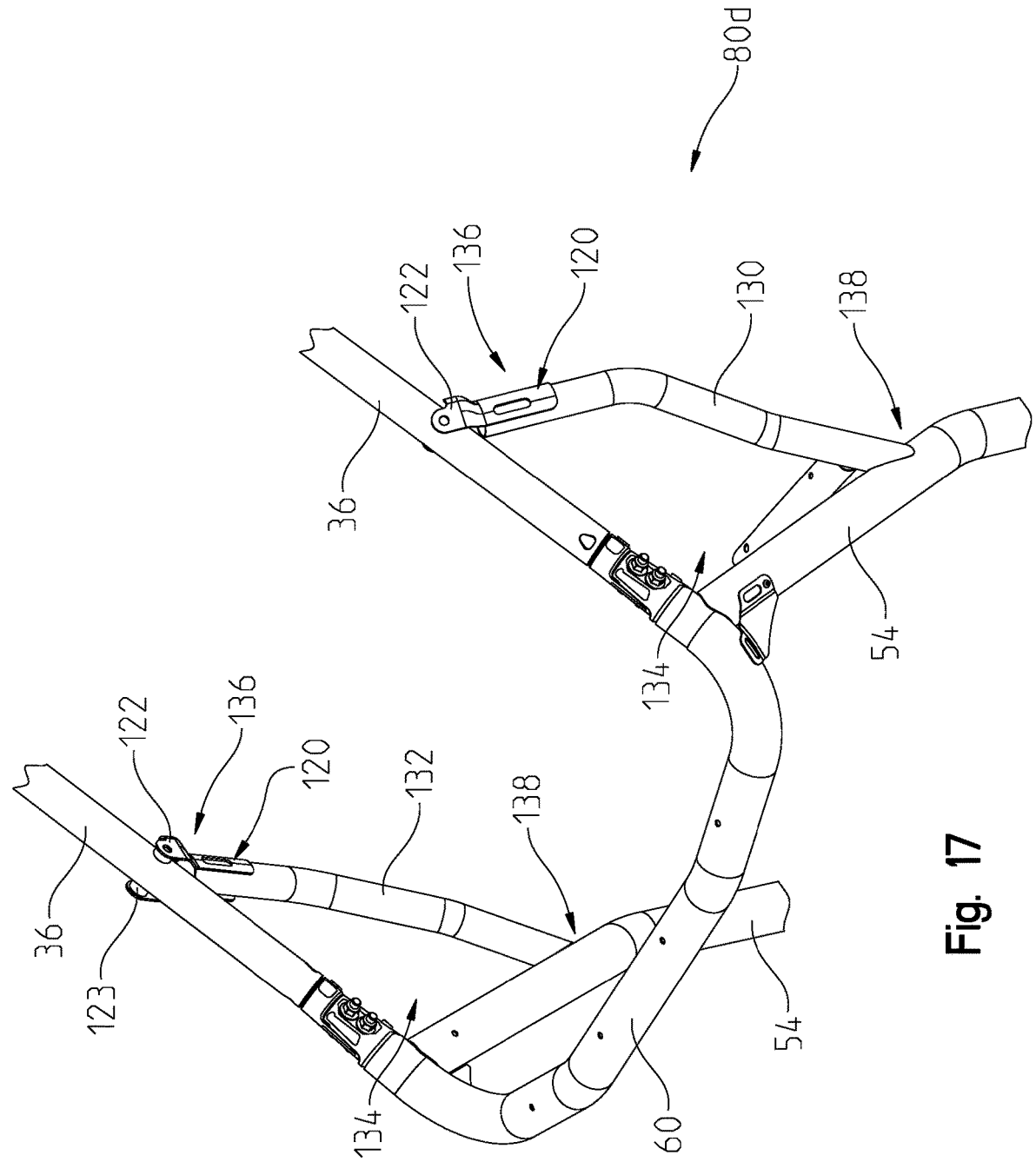
FIG. 17 shows a further enlarged front left perspective view of the support frame assembly of FIG. 16.
Figure 18:
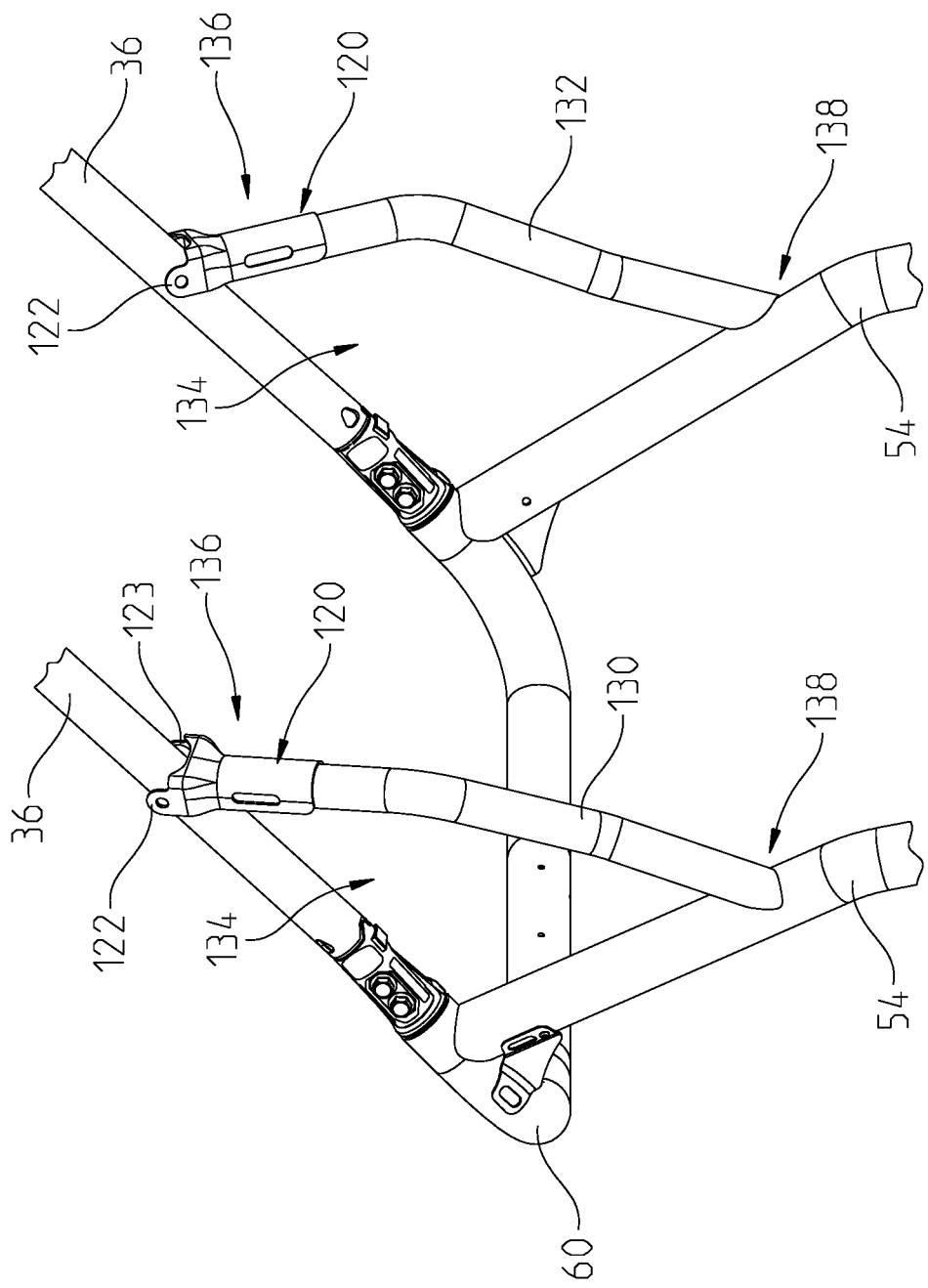
FIG. 18 is an enlarged rear left perspective view of the support frame assembly of FIG. 17.

Referring now to FIGS. 16-18, a further embodiment 80d of support section 80 is shown. Support section 80d is substantially similar to third embodiment 80c but includes first and second vertically-extending frame members 130, 132 which are bent or otherwise non-linear rather than substantially linear like first and second vertical support member 110 and 112 of support section 80c. Support section 80d does not include laterally-extending frame member 114 coupling frame members 130 and 132. In addition, opening 134 of support section 80d, while extending between either vertically-extending support member 130 or 132 and the respective longitudinal frame member 36 and front upwardly-extending frame member 54 it is coupled to, is not triangular in shape but rather in the shape of a polygon. In various embodiments, a first end 136 of vertically-extending support members 130 and 132 is coupled to longitudinal frame member 36 via bracket 120, while a second end 138 of vertically-extending support member 130 and 132 is welded to front upwardly-extending frame member 54. However, similar connections for vertical support members 110 and 112 are possible as well, as disclosed above.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A vehicle, having a front portion and a rear portion, the vehicle comprising:
   a plurality of ground-engaging members; and
   a frame assembly extending longitudinally between the front portion and the rear portion, the frame assembly including a front frame assembly at least partially defining the front portion, the front frame assembly including,
      an upper frame portion including a longitudinally extending frame member,
      a lower frame portion, and
      a support frame assembly positioned at a front portion of the front frame assembly, the support frame assembly being separable from the upper frame portion and the lower frame portion, the support frame assembly including a first member, a second member positioned laterally opposite the first member, and a laterally-extending member coupled between the first member and the second member,
      wherein the support frame assembly is configured to reinforce the upper frame portion, and
      wherein the longitudinally extending frame member extends toward the lower frame portion, and a first end of the first member is coupled to the longitudinally extending frame member.

2. The vehicle of claim 1, wherein the first member includes a first panel, and the second member includes a second panel.

3. The vehicle of claim 1, wherein the first member includes a first generally vertically extending member and the second member includes a second generally vertically extending member.

4. The vehicle of claim 3, wherein the first and second generally vertically extending members include at least one bend.

5. A vehicle having a front portion and a rear portion, the vehicle comprising:
- a plurality of ground-engaging members;
- a seating area including an operator seat supported by the plurality of ground-engaging members; and
- a frame assembly supported by the plurality of ground engaging members and extending from the front portion to the rear portion, the frame assembly including,
    - an upper frame portion extending over a portion of the seating area,
    - a support frame including a first member in vertical relation to the frame assembly having a first end and a second end, the first end in contact with a portion of the upper frame portion, and
    - a lower frame portion including an upwardly extending frame member extending toward the upper frame portion, and the second end of the first member is coupled to the upwardly extending frame member,
    - wherein the support frame is configured to reinforce the frame assembly.

6. The vehicle of claim 5, wherein the support frame includes a second member positioned laterally opposite the first panel.

7. The vehicle of claim 6, wherein the support assembly further includes a laterally-extending frame member extending between the first member and the second member.

8. The vehicle of claim 7, wherein the first member defines a first indentation to receive a first end of the laterally-extending frame member and the second member defines a second indentation to receive a second end of the laterally-extending frame member.

9. The vehicle of claim 5, wherein the upper frame portion includes a longitudinally extending frame member extending toward the lower frame portion, and the first end of the first member is coupled to the longitudinally extending frame member.

10. The vehicle of claim 5, wherein the second end of the first member includes a recess configured to at least partially receive a portion of the upwardly extending frame member the upwardly extending frame member via at least one recessed extension of the first panel.

11. The vehicle of claim 5, wherein the second end of the first member is mechanically coupled to the upwardly extending frame member via a bracket.

12. The vehicle of claim 5, wherein the support frame is removable from the frame assembly.

13. A vehicle having a front portion and a rear portion, the vehicle comprising:
- a plurality of ground-engaging members;
- a seating area including an operator seat supported by the plurality of ground-engaging members; and
- a frame assembly supported by the plurality of ground engaging members and extending from the front portion to the rear portion, the frame assembly including,
    - an upper frame portion extending over a portion of the seating area, the upper frame portion including at least one longitudinally extending frame member,
    - a support frame including a first upstanding member, the first upstanding member including a first end coupled to the at least one longitudinally extending frame member, and
    - a lower frame portion including at least one upwardly extending frame member, the at least one upwardly extending frame member coupled to a second end of the first upstanding member,
    - wherein the support frame is configured to reinforce the frame assembly, and
    - wherein the support frame is removable from the frame assembly.

14. The vehicle of claim 13, wherein the support frame includes a second upstanding member positioned laterally opposite the first upstanding member.

15. The vehicle of claim 14, wherein the support assembly further includes a laterally-extending frame member extending between the first upstanding member and the second upstanding member.

16. The vehicle of claim 13, wherein the first upstanding member is substantially vertical.

17. The vehicle of claim 13, wherein the first upstanding member includes at least one bend.

18. The vehicle of claim 13, wherein the first upstanding member is welded to at least one of the upper frame portion and the lower frame portion.

19. The vehicle of claim 13, wherein the first upstanding member is removably coupled to at least one of the upper frame portion and the lower frame portion via a bracket.

20. The vehicle of claim 1, wherein the support frame assembly includes at least one mechanically coupled joint between the support frame and a remainder of the frame.

* * * * *